US011869682B2

(12) United States Patent
Nabeta

(10) Patent No.: US 11,869,682 B2
(45) Date of Patent: Jan. 9, 2024

(54) ELECTRICAL CABLE MANUFACTURING METHOD AND ELECTRICAL CABLE MANUFACTURING APPARATUS

(71) Applicant: Yazaki Corporation, Tokyo (JP)

(72) Inventor: Yasunori Nabeta, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 357 days.

(21) Appl. No.: 17/485,307

(22) Filed: Sep. 24, 2021

(65) Prior Publication Data

US 2022/0102030 A1 Mar. 31, 2022

(30) Foreign Application Priority Data

Sep. 28, 2020 (JP) ................................. 2020-161643

(51) Int. Cl.

| | |
|---|---|
| ***H01B 13/06*** | (2006.01) |
| ***H01B 7/02*** | (2006.01) |
| ***H01B 13/22*** | (2006.01) |
| *H01R 43/02* | (2006.01) |

(52) U.S. Cl.

CPC ........... *H01B 13/06* (2013.01); *H01B 7/0208* (2013.01); *H01B 13/22* (2013.01); *H01R 43/0207* (2013.01)

(58) Field of Classification Search

CPC ...... H01B 13/06; H01B 7/0208; H01B 13/22; H01B 43/0207

See application file for complete search history.

(56) References Cited

U.S. PATENT DOCUMENTS

| | | | | |
|---|---|---|---|---|
| 7,744,395 B1 * | 6/2010 | Cantolino | .............. | H01R 24/84 439/279 |
| 10,276,283 B2 * | 4/2019 | Nabeta | ................... | H01R 4/625 |
| 2004/0088857 A1 * | 5/2004 | Fujimoto | ............... | H01R 11/12 29/871 |
| 2012/0318554 A1 * | 12/2012 | Koto | ...................... | H01R 4/625 29/869 |
| 2019/0165533 A1 * | 5/2019 | Nabeta | ................... | H01R 43/28 |
| 2020/0091691 A1 | 3/2020 | Sato et al. | | |

FOREIGN PATENT DOCUMENTS

| | | |
|---|---|---|
| JP | 2007-185706 A | 7/2007 |
| JP | 2020-47423 A | 3/2020 |

* cited by examiner

*Primary Examiner* — Phuong Chi Thi Nguyen
(74) *Attorney, Agent, or Firm* — KENEALY VAIDYA LLP

(57) ABSTRACT

An electrical cable manufacturing method includes: in a joining device including a first facing surface and a second facing surface facing each other in a first direction, and a pressing member and a vibrating member facing each other in a second direction, setting an interval between the first facing surface and the second facing surface to a first distance; placing core wires between the first facing surface and the second facing surface having the interval set at the first distance; and joining the core wires by ultrasonic vibration. The core wires include core wires having different outer diameters. The first distance is larger than a maximum value between values of outer diameters of the core wires and smaller than the sum of the maximum value and a minimum value.

3 Claims, 11 Drawing Sheets

ELECTRICAL CABLE MANUFACTURING METHOD AND ELECTRICAL CABLE MANUFACTURING APPARATUS

CROSS-REFERENCE TO RELATED APPLICATION(S)

The present application claims priority to and incorporates by reference the entire contents of Japanese Patent Application No. 2020-161643 filed in Japan on Sep. 28, 2020.

BACKGROUND OF THE INVENTION

1. Field of the Invention

The present invention relates to an electrical cable manufacturing method and an electrical cable manufacturing apparatus.

2. Description of the Related Art

A conventional technique is known that uses ultrasonic waves to join core wires of electrical cables. Japanese Patent Application Laid-open No. 2007-185706 discloses an ultrasonic joining method that sandwiches core wires of two electrical cables among a plurality of electrical cables between a pair of molds and then applies ultrasonic vibration to one of the paired molds, thereby joining the core wires of the two electrical cables.

When a plurality of core wires including core wires having different diameters are joined, it is preferable to properly arrange the core wires. For example, core wires aligned in a direction parallel with an ultrasonic vibration plane may cause incomplete joining.

SUMMARY OF THE INVENTION

An object of the present invention is to provide an electrical cable manufacturing method and an electrical cable manufacturing apparatus that can properly join a plurality of core wires including core wires having different diameters.

In order to achieve the above mentioned object, an electrical cable manufacturing method according to one aspect of the present invention includes setting an interval between a first facing surface and a second facing surface in a first direction to a first distance, in a joining device including the first facing surface and the second facing surface facing each other in the first direction, and a pressing member and a vibrating member facing each other in a second direction orthogonal to the first direction; placing a plurality of core wires between the first facing surface and the second facing surface having the interval set at the first distance; and joining the core wires by using the vibrating member to apply ultrasonic vibration to the core wires while sandwiching the core wires between the pressing member and the vibrating member, wherein the core wires include core wires having outer diameters having mutually different values, and the first distance is larger than a maximum value between values of outer diameters of the core wires and smaller than a sum of the maximum value and a minimum value between the values of the outer diameters of the core wires.

According to another aspect of the present invention, in the electrical cable manufacturing method, it is preferable that the electrical cable manufacturing method further includes setting a value of the first distance in the joining device, wherein the core wires are tied together, and an information recording medium on which information about the first distance is recorded is attached to the core wires, and at the setting the value of the first distance, the joining device acquires the information recorded on the information recording medium and sets the value of the first distance.

In order to achieve the above mentioned object, an electrical cable manufacturing apparatus according to still another aspect of the present invention includes a first facing surface and a second facing surface facing each other in a first direction; a pressing member and a vibrating member facing each other in a second direction orthogonal to the first direction; a controller configured to acquire a first distance corresponding to outer diameters of a plurality of core wires to be joined; and a driving mechanism configured to vary an interval between the first facing surface and the second facing surface in the first direction, wherein the first distance is larger than a maximum value between values of the outer diameters of the core wires and smaller than a sum of the maximum value and a minimum value between the values of the outer diameters of the core wires, the electrical cable manufacturing apparatus is configured to receive the core wires in a gap between the first facing surface and the second facing surface with the interval set at the first distance, and join the core wires by ultrasonic vibration applied to the core wires by the vibrating member while sandwiching the core wires between the pressing member and the vibrating member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An electrical cable manufacturing method and an electrical cable manufacturing apparatus according to an embodiment of the present invention will be described in detail below with reference to the drawings. Note that this embodiment should not be construed to limit this invention. Furthermore, constituents of the following embodiment include constituents that can be easily conceived by those skilled in the art or that are substantially the same.

Embodiment

Figure 1:
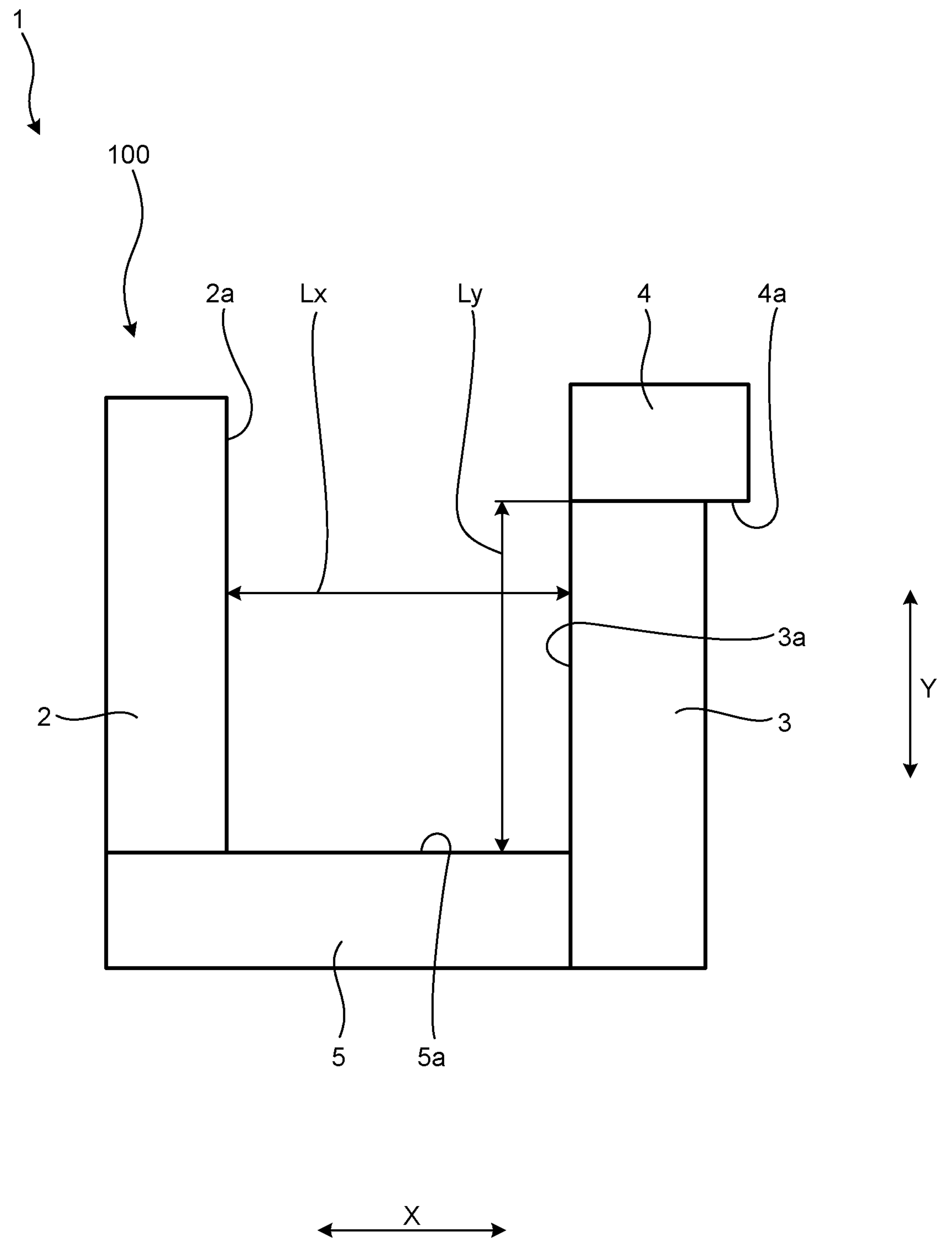
FIG. 1 is a diagram illustrating an electrical cable manufacturing apparatus according to an embodiment.
Figure 2:
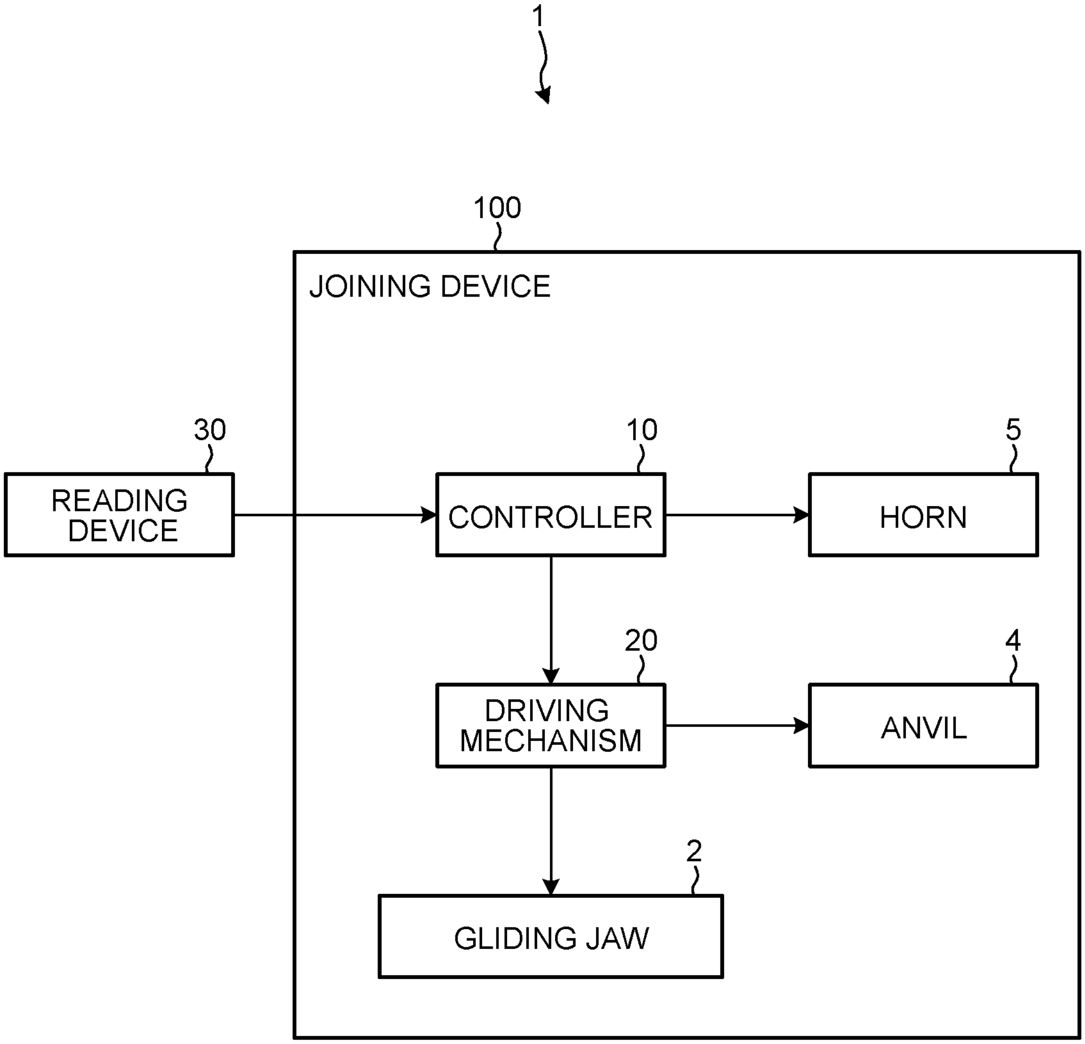
FIG. 2 is a block diagram of the electrical cable manufacturing apparatus according to the embodiment.
Figure 3:
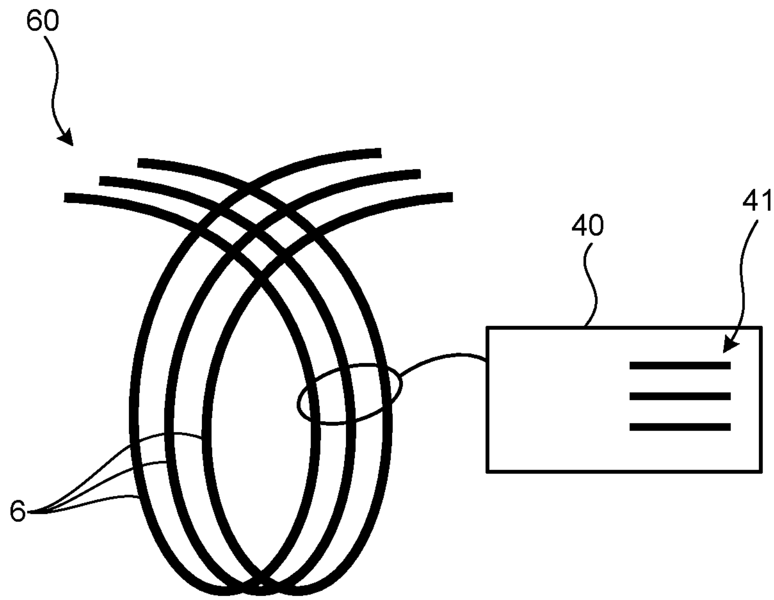
FIG. 3 is a diagram of an electrical cable bundle and an information recording medium according to the embodiment.
Figure 4:
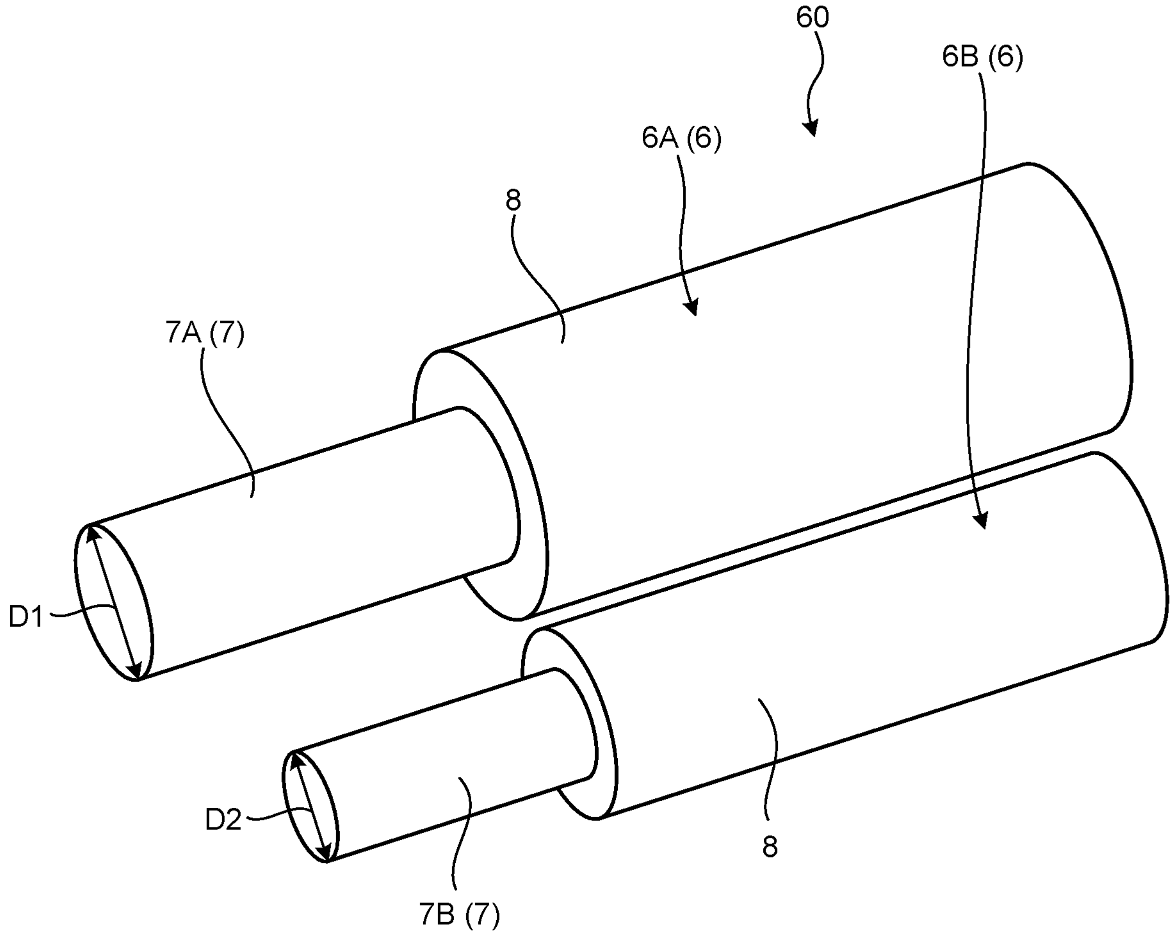
FIG. 4 is a perspective view of the electrical cable bundle according to the embodiment.
Figure 5:
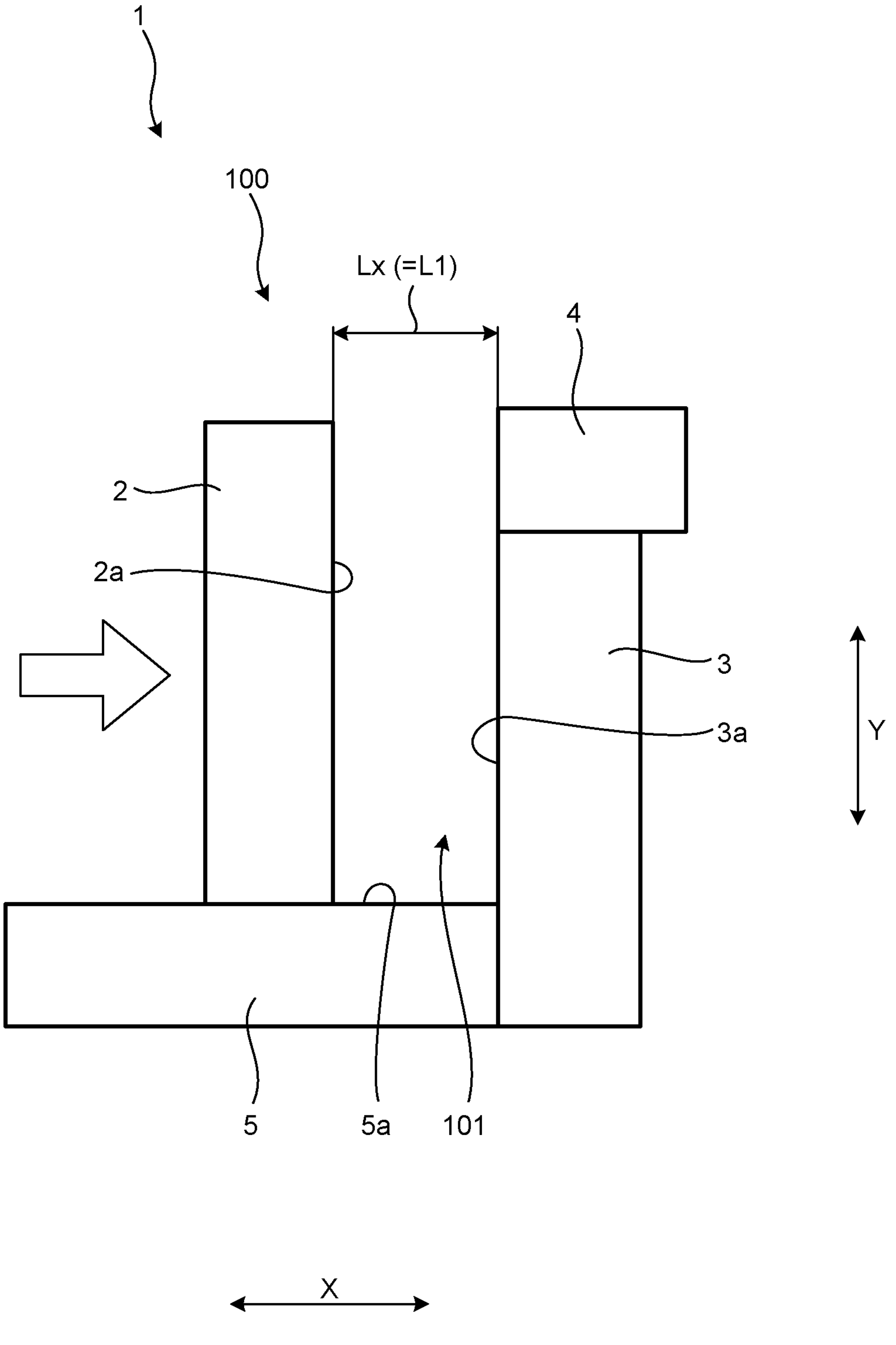
FIG. 5 is an explanatory diagram of a positioning process in the embodiment.
Figure 6:
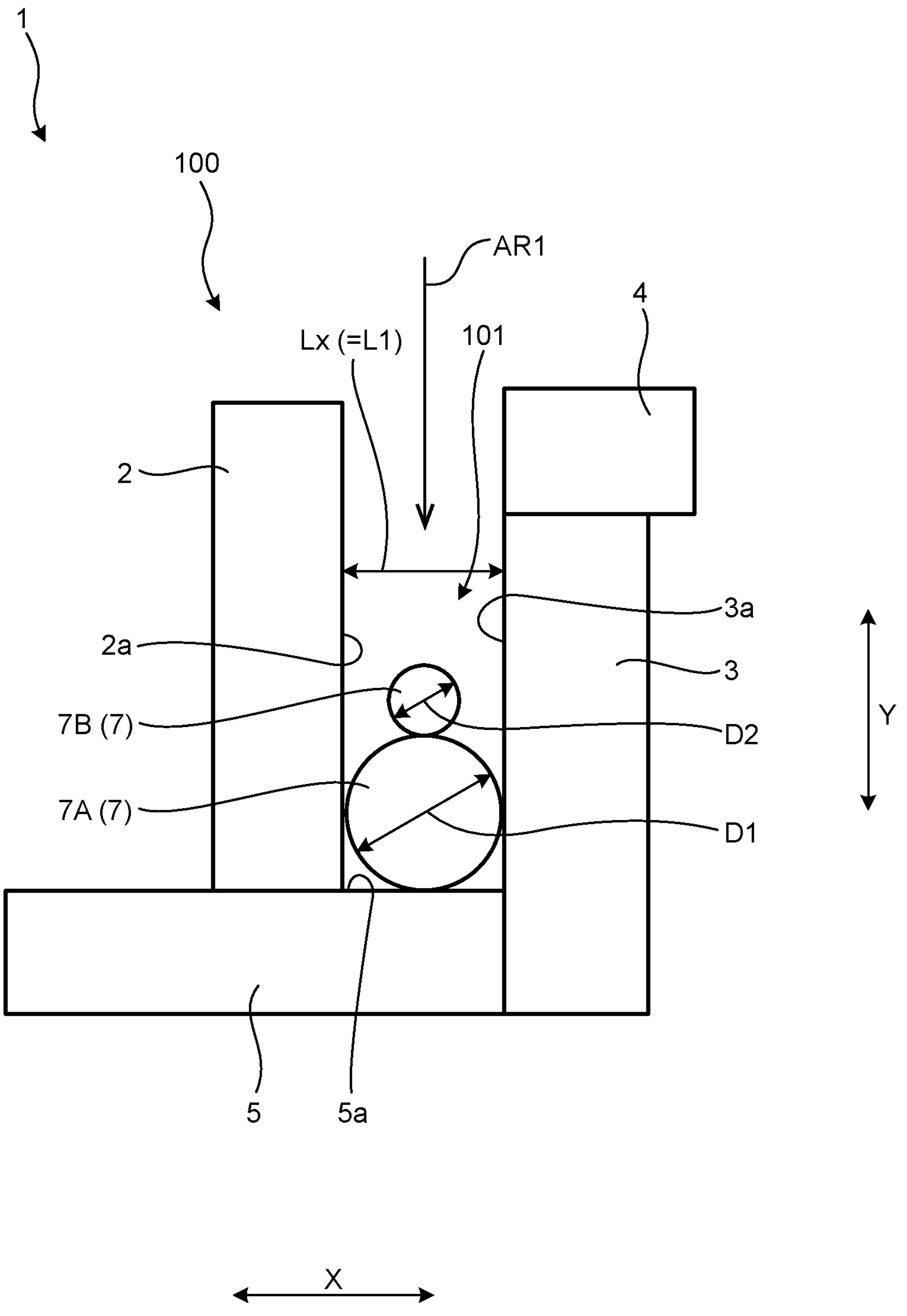
FIG. 6 is an explanatory diagram of a placing process in the embodiment.
Figure 7:
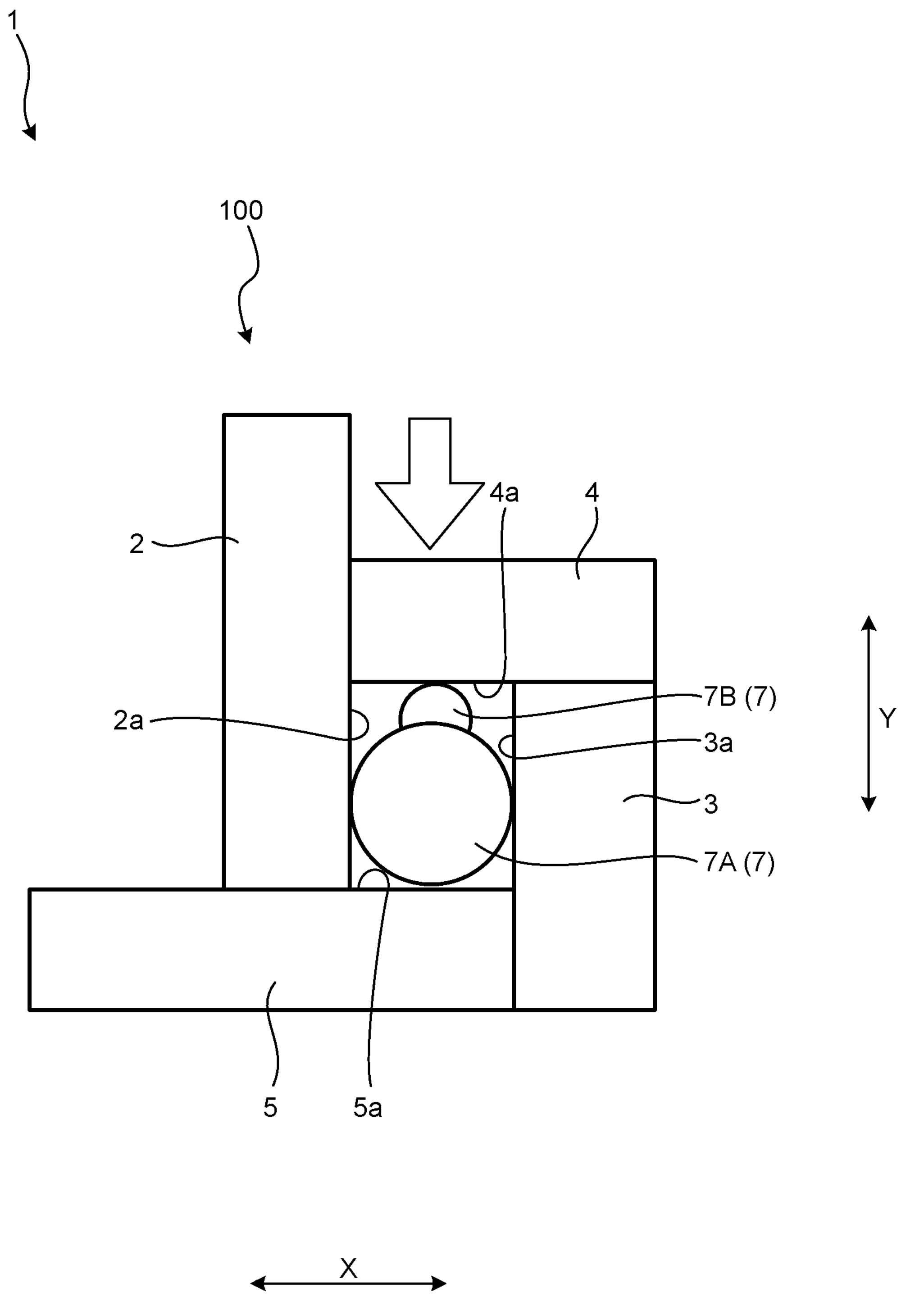
FIG. 7 is an explanatory diagram of a joining process in the embodiment.
Figure 8:
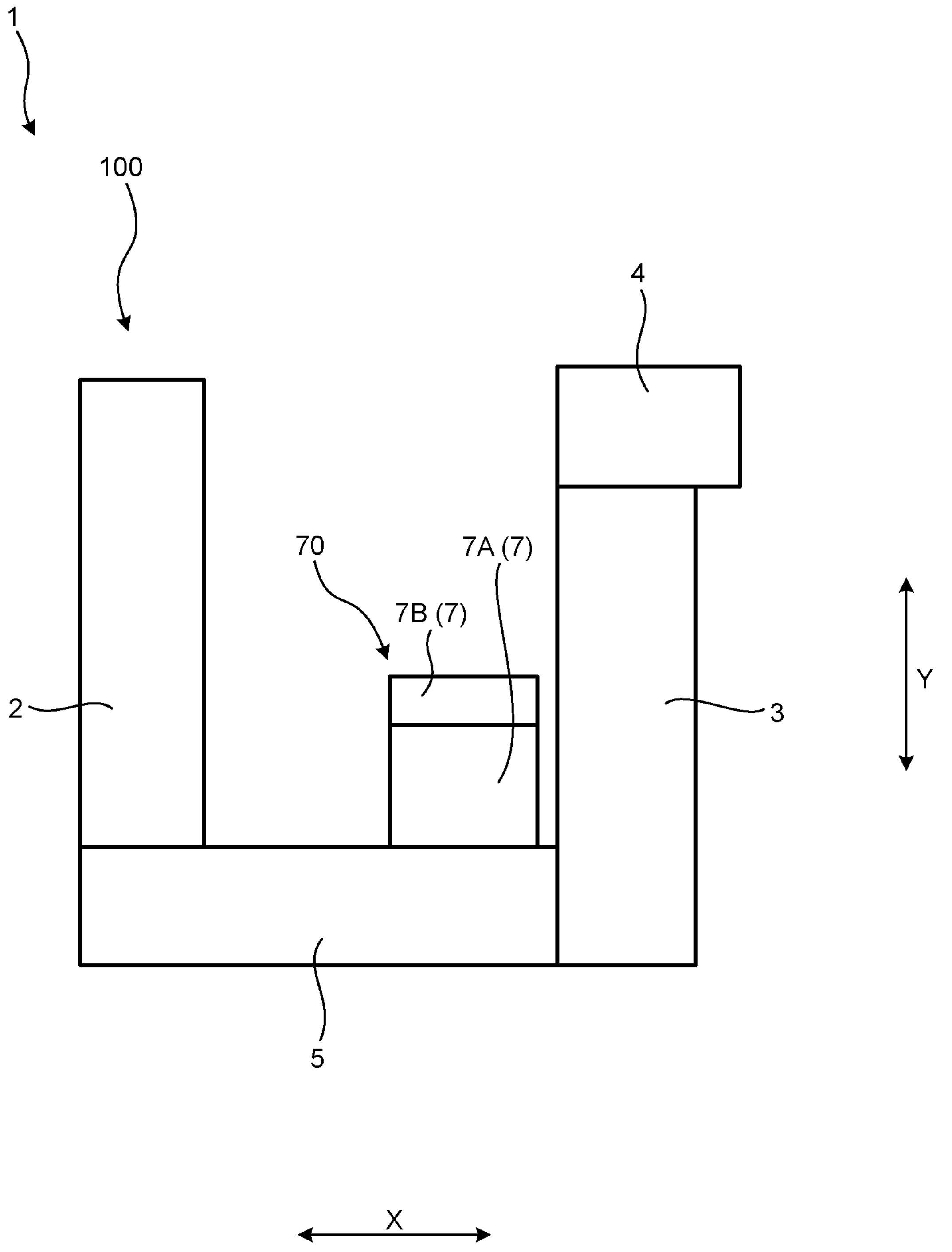
FIG. 8 is a diagram illustrating a joined core wire.
Figure 9:
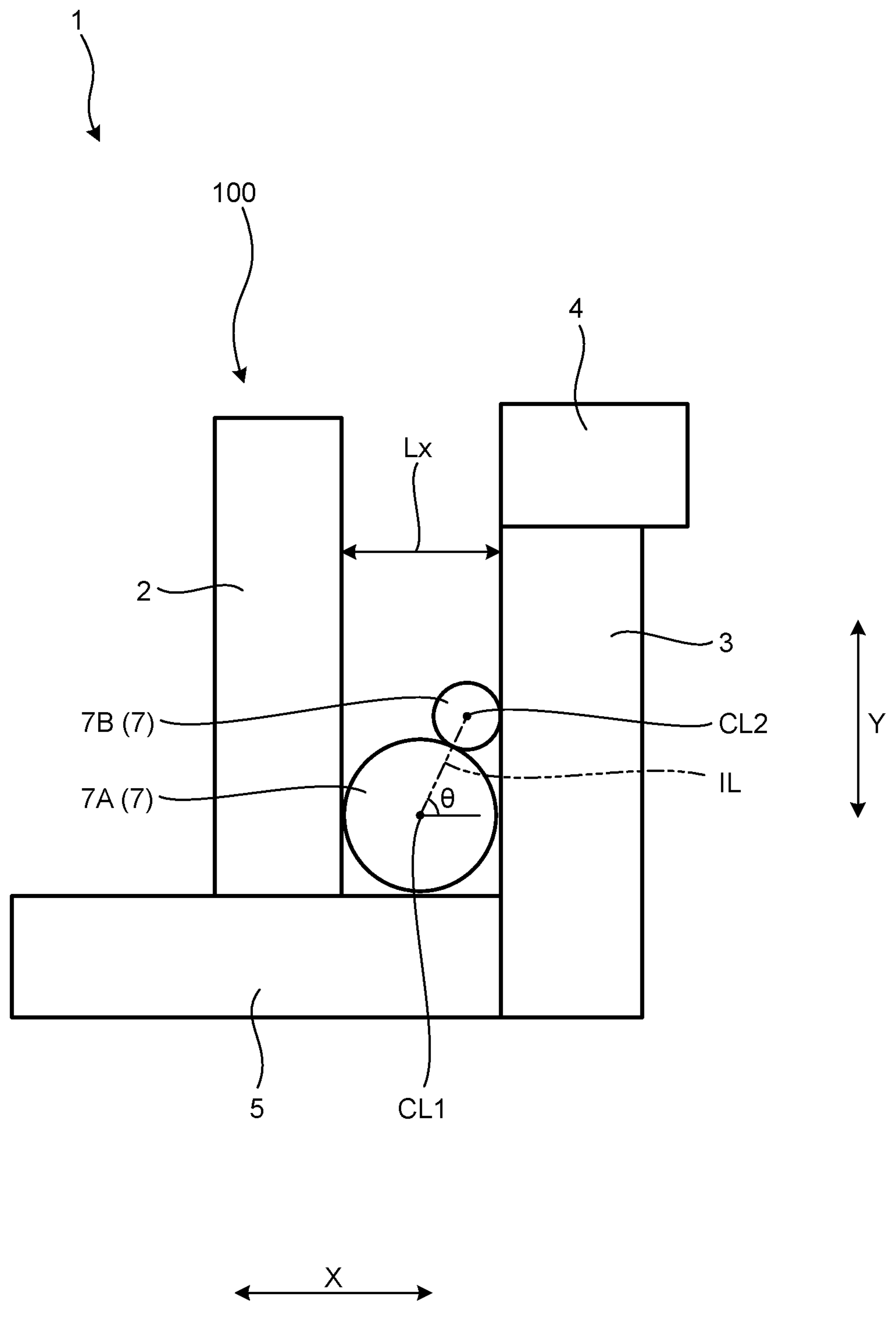
FIG. 9 is an explanatory diagram of arrangement of a plurality of core wires in a gap.
Figure 10:
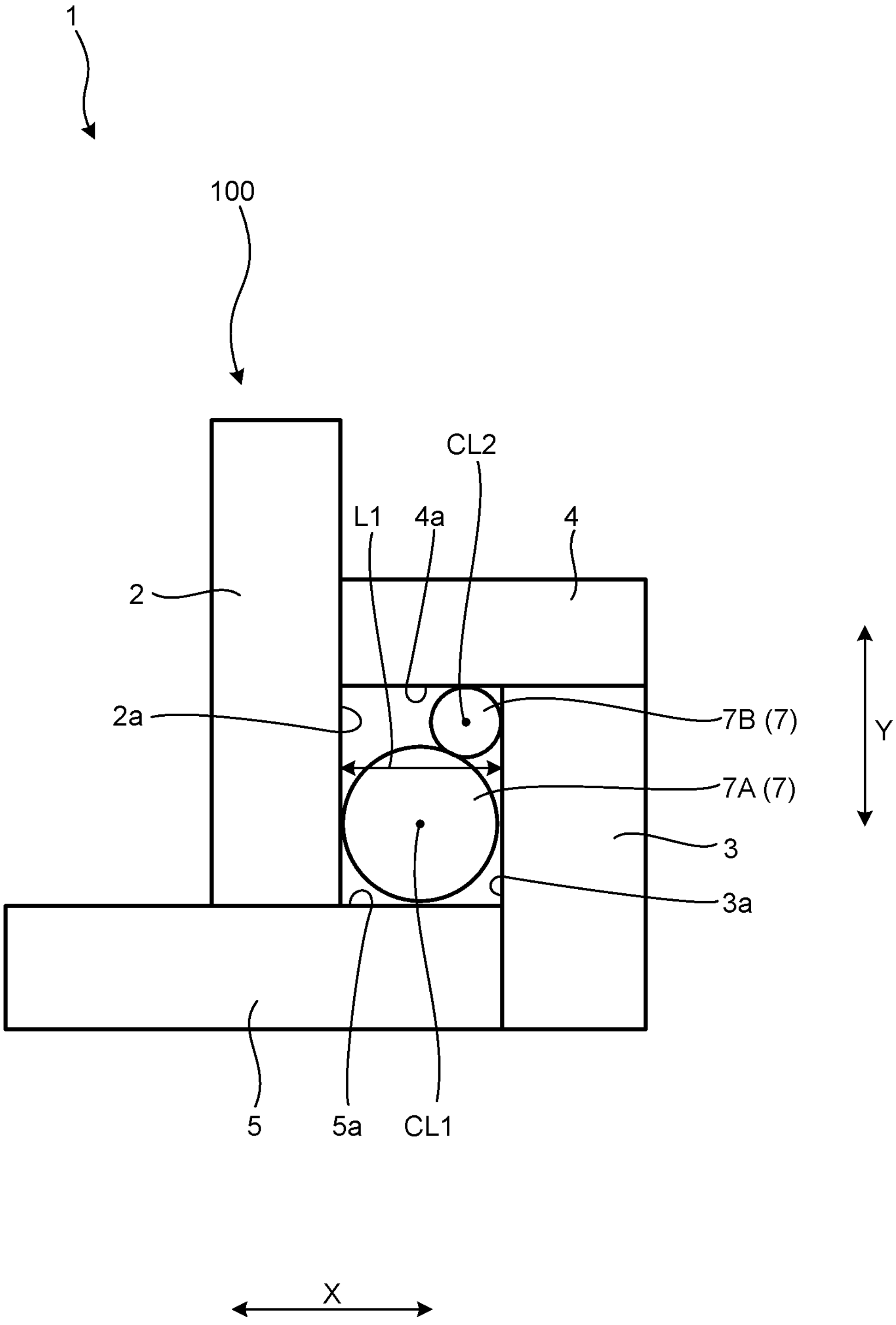
FIG. 10 is a diagram illustrating a state where a second core wire comes into contact with an anvil.
Figure 11:
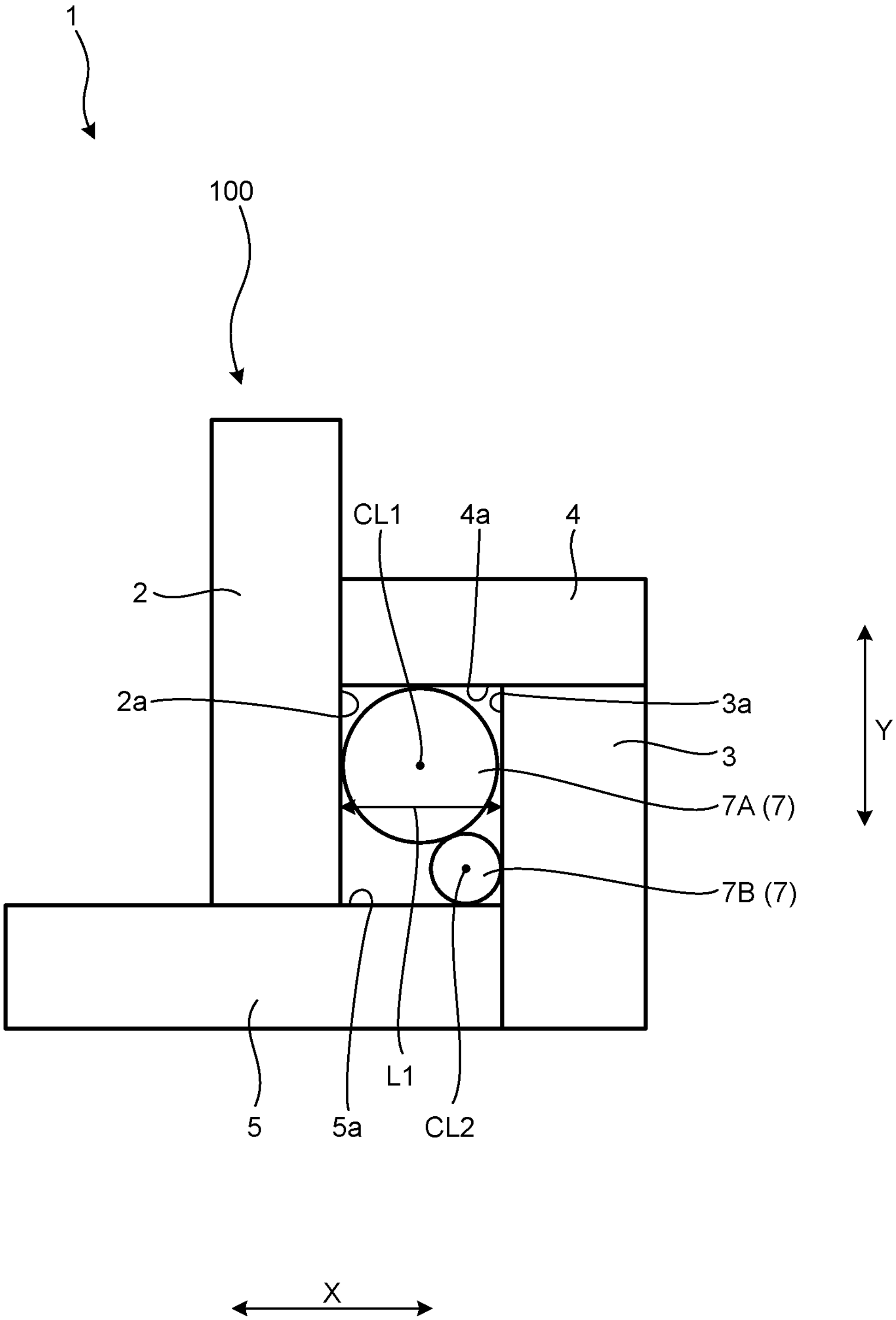
FIG. 11 is a diagram illustrating a state where the second core wire comes into contact with a horn.
Figure 12:
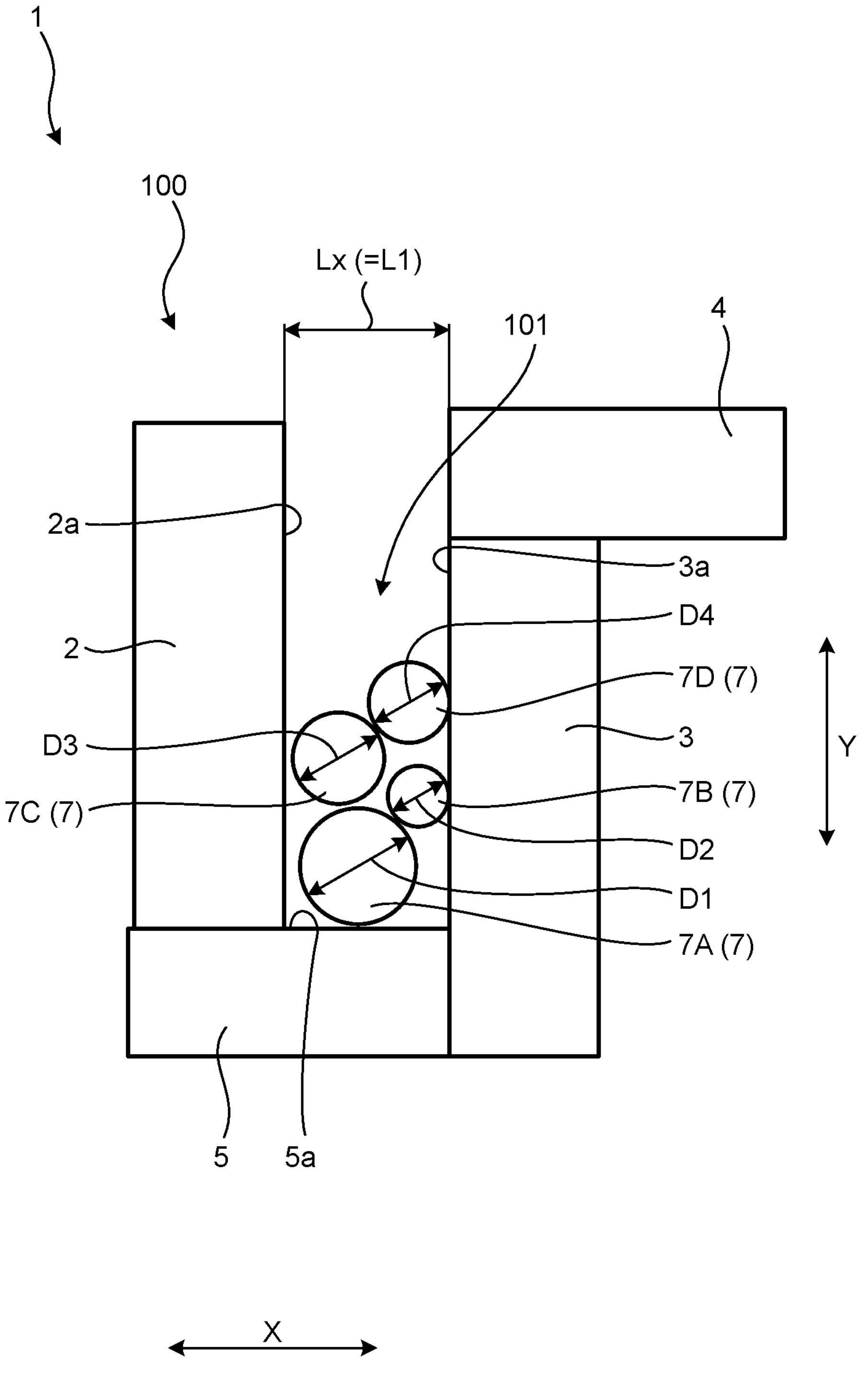
FIG. 12 is a diagram illustrating four core wires accommodated in the gap.

An embodiment will be described with reference to FIGS. 1 to 12. The present embodiment relates to an electrical cable manufacturing method and an electrical cable manufacturing apparatus. FIG. 1 is a diagram illustrating an electrical cable manufacturing apparatus according to the embodiment; FIG. 2 is a block diagram of the electrical cable manufacturing apparatus according to the embodiment; FIG. 3 is a diagram of an electrical cable bundle and an information recording medium according to the embodiment; FIG. 4 is a perspective view of the electrical cable bundle according to the embodiment; FIG. 5 is an explanatory diagram of a positioning process in the embodiment; FIG. 6 is an explanatory diagram of a placing process in the embodiment; FIG. 7 is an explanatory diagram of a joining process in the embodiment; FIG. 8 is a diagram illustrating a joined core wire; FIG. 9 is an explanatory diagram of arrangement of a plurality of core wires in a gap; FIG. 10 is a diagram illustrating a state where a second core wire comes into contact with an anvil; FIG. 11 is a diagram illustrating a state where the second core wire comes into contact with a horn; and FIG. 12 is a diagram illustrating four core wires accommodated in the gap.

As illustrated in FIG. 1, an electrical cable manufacturing apparatus 1 of the embodiment includes a joining device 100. The joining device 100 includes a gliding jaw 2, an anvil plate 3, an anvil 4, and a horn 5. The gliding jaw 2 and the anvil plate 3 face each other in a first direction X. The first direction X is, for example, the horizontal direction. The gliding jaw 2 and the anvil plate 3 are shaped into flat plates, for example. The gliding jaw 2 includes a first facing surface 2*a*. The anvil plate 3 includes a second facing surface 3*a*. The first facing surface 2*a* and the second facing surface 3*a* face each other in the first direction X. The first facing surface 2*a* and the second facing surface 3*a* are flat and extend in parallel with each other, for example.

The anvil 4 and the horn 5 face each other in a second direction Y. The second direction Y is a direction orthogonal to the first direction X and is, for example, the vertical direction. The anvil 4 and the horn 5 are, for example, flat-plate members. The anvil 4 is a member to sandwich a plurality of core wires 7 between the anvil 4 and the horn 5. The anvil 4 presses the core wires 7 against the horn 5. The horn 5 is vibrated by an ultrasonic oscillator and thus generates ultrasonic vibration. The anvil 4 includes a third facing surface 4*a*. The horn 5 includes a fourth facing surface 5*a*. The third facing surface 4*a* and the fourth facing surface 5*a* face each other in the second direction Y. The third facing surface 4*a* and the fourth facing surface 5*a* are flat and extend in parallel with each other, for example.

As illustrated in FIG. 2, the electrical cable manufacturing apparatus 1 includes the joining device 100 and a reading device 30. The joining device 100 includes a controller 10 and a driving mechanism 20. The driving mechanism 20 includes a mechanism that moves the gliding jaw 2 in the first direction X and a mechanism that moves the anvil 4 in the second direction Y. In the electrical cable manufacturing apparatus 1 of the present embodiment, the driving mechanism 20 varies an interval Lx between the first facing surface 2*a* and the second facing surface 3*a* in the first direction X. In the electrical cable manufacturing apparatus 1, the driving mechanism 20 varies an interval Ly between the third facing surface 4*a* and the fourth facing surface 5*a* in the second direction Y. The driving mechanism 20 moves the gliding jaw 2 and the anvil 4 using air pressure or fluid pressure, for example.

The controller 10 includes a control circuit, such as an integrated circuit. The controller 10 can execute a computer program controlling each of the constituents of the electrical cable manufacturing apparatus 1. The controller 10 outputs a command signal to the driving mechanism 20. The controller 10 outputs, for example, a target value of the interval Lx between the first facing surface 2*a* and the second facing surface 3*a* as a command signal. In response to this command signal, the driving mechanism 20 controls the position of the gliding jaw 2 to set the interval Lx to the target value. The controller 10 outputs, for example, a target value of pressing strength with which the anvil 4 presses the core wires 7, as a command signal. In response to this command signal, the driving mechanism 20 controls the position of the anvil 4 and strength applied to the anvil 4 to set the pressing strength to the target value.

The reading device 30 is a device to read information recorded on an information recording medium 40. As illustrated in FIG. 3, a plurality of electrical cables 6 to be joined are gathered as an electrical cable bundle 60. The information recording medium 40 is attached to the electrical cable bundle 60. The information recording medium 40 is, for example, a tag or a card. On the exemplified information recording medium 40, information is recorded in the form of a two-dimensional barcode 41. The information recorded on the information recording medium 40 includes information about a first distance L1. The first distance L1 is a value set as the target value of the interval Lx. The first distance L1 will be described in detail later.

The reading device 30 is, for example, a scanner scanning the two-dimensional barcode 41. The reading device 30 can communicate with the controller 10. The reading device 30 is connected to the controller 10 via a communication line so as to communicate with the controller 10 through wire, for example. The reading device 30 outputs the information read from the information recording medium 40, to the controller 10.

As illustrated in FIG. 4, the electrical cable bundle 60 includes the electrical cables 6. The electrical cables 6 each include the core wire 7 and a sheath 8. The core wire 7 is, for example, a stranded wire including a plurality of element wires. The core wire 7 may be a solid wire. The core wire 7 is made from conductive metal, such as copper, a copper alloy, aluminum, and an aluminum alloy. The sheath 8 has insulating properties and is made from, for example, synthetic resin or the like. The core wire 7 has an end protruding from the sheath 8. In other words, an end portion of the sheath 8 is removed to expose the end of the core wire 7. The exemplified core wire 7 has a circular cross section.

The exemplified electrical cable bundle 60 includes a first electrical cable 6A and a second electrical cable 6B. In the following description, the core wire 7 of the first electrical cable 6A is referred to as a first core wire 7A, and the core wire 7 of the second electrical cable 6B is referred to as a second core wire 7B. The first core wire 7A has a diameter D1, and the second core wire 7B has a diameter D2. The diameter D1 of the first core wire 7A is larger than the diameter D2 of the second core wire 7B. The diameter D1 has a value twice as much as the diameter D2, for example.

In the electrical cable bundle 60, the core wires 7 are tied together so as to be adjacent to each other.

An electrical cable manufacturing method according to the present embodiment will now be described. The electrical cable manufacturing method includes a positioning process, a placing process, and a joining process.

Positioning Process

At the positioning process, the interval Lx between the first facing surface 2*a* and the second facing surface 3*a* is set to the first distance L1. At the positioning process, an operator causes the reading device 30 to read the information recorded on the information recording medium 40. The controller 10 determines the first distance L1 on the basis of the information acquired from the reading device 30.

The first distance L1 in the present embodiment has a value falling within a range indicated by the following expression (1). A maximum diameter Dmax indicates a maximum value between values of diameters D of the core wires 7. In the case of the electrical cable bundle 60 exemplified in FIG. 4, the diameter D1 of the first core wire 7A is the maximum diameter Dmax. A minimum diameter Dmin indicates a minimum value between the values of the diameters D of the core wires 7. In the case of the electrical cable bundle 60 exemplified in FIG. 4, the diameter D2 of the second core wire 7B is the minimum diameter Dmin.

$$D\max < L1 < D\max + D\min \quad (1)$$

The information recorded on the information recording medium 40 may be a value of the first distance L1 itself. The aforementioned information may be a value of the maximum diameter Dmax and a value of the minimum diameter Dmin of the core wires 7 included in the electrical cable bundle 60. In this case, the controller 10 calculates the first distance L1 using a predetermined computational expression on the basis of the acquired maximum diameter Dmax and minimum diameter Dmin.

The aforementioned information may be values of the diameters D of all the core wires 7 included in the electrical cable bundle 60. In this case, the controller 10 determines the maximum diameter Dmax and the minimum diameter Dmin from a set of the acquired values of the diameters D and calculates the first distance L1.

The controller 10 issues, to the driving mechanism 20, a command to set the interval Lx between the first facing surface 2*a* and the second facing surface 3*a* in the first direction X to the first distance L1. As illustrated in FIG. 5, in response to the command received from the controller 10, the driving mechanism 20 moves the gliding jaw 2 to set the interval Lx to the first distance L1. When completing the positioning of the gliding jaw 2, the driving mechanism 20 notifies the controller 10 of the completion of the positioning. The controller 10 notifies the operator of the completion of the positioning using a lamp, sound, or the like, for example.

Placing Process

At the placing process, the core wires 7 are placed between the first facing surface 2*a* and the second facing surface 3*a* having the interval Lx set at the first distance L1. As illustrated with an arrow AR1 in FIG. 6, the operator inserts the first core wire 7A and the second core wire 7B into a gap 101 between the first facing surface 2*a* and the second facing surface 3*a*. Here, the interval Lx is smaller than the sum of the diameter D1 of the first core wire 7A and the diameter D2 of the second core wire 7B. Thus, the first core wire 7A and the second core wire 7B are inserted in a state where the position of the first core wire 7A and the position of the second core wire 7B in the second direction Y are deviated from each other. In other words, when the core wires 7A and 7B are inserted into the gap 101, the second core wire 7B is positioned below or above the first core wire 7A.

As a result, as illustrated in FIG. 6, the first core wire 7A and the second core wire 7B are accommodated in a space between the first facing surface 2*a* and the second facing surface 3*a* in a state of being aligned in the second direction Y. The core wire 7 having a relatively large diameter D among the core wires 7 preferably comes into contact with the horn 5. When completing the placement of the first core wire 7A and the second core wire 7B, the operator issues, to the electrical cable manufacturing apparatus 1, a command to start the joining process. This command is issued through, for example, operation input to a foot switch of the electrical cable manufacturing apparatus 1.

Joining Process

At the joining process, ultrasonic vibration is applied to the core wires 7 to join the core wires 7. The controller 10 starts the joining process in response to the command from the operator. At the joining process, the controller 10 causes the driving mechanism 20 to move the anvil 4 to a facing position. As illustrated in FIG. 7, the facing position is a position where the third facing surface 4*a* of the anvil 4 faces the fourth facing surface 5*a* of the horn 5 in the second direction Y. The controller 10 also moves the anvil 4 toward the horn 5 to sandwich the first core wire 7A and the second core wire 7B between the anvil 4 and the horn 5. The driving mechanism 20 moves the anvil 4 in response to a command from the controller 10, and the anvil 4 presses the first core wire 7A and the second core wire 7B against the horn 5.

The controller 10 issues, to the ultrasonic oscillator, a command to start ultrasonic vibration. The ultrasonic oscillator vibrates the horn 5 with ultrasonic waves in response to the command from the controller 10, thereby applying ultrasonic vibration to the first core wire 7A and the second core wire 7B. The first core wire 7A and the second core wire 7B are joined to each other by the ultrasonic vibration and the pressing strength. After a lapse of a predetermined period of time, the controller 10 issues, to the ultrasonic oscillator, a command to end the ultrasonic vibration and issues, to the driving mechanism 20, a command to move the anvil 4 and the gliding jaw 2.

As illustrated in FIG. 8, the driving mechanism 20 moves the anvil 4 upward and from the facing position to an opening position in the first direction X. As illustrated in FIG. 8, the opening position of the anvil 4 is a position where a space portion between the first facing surface 2*a* and the second facing surface 3*a* is open. The driving mechanism 20 also moves the gliding jaw 2 in a direction separating from the anvil plate 3. FIG. 8 illustrates a joined core wire 70. The first core wire 7A and the second core wire 7B are joined and integrated. The operator takes out the joined core wire 70 and starts operation for joining a subsequent electrical cable bundle 60.

The first distance L1 may be determined in the following manner, for example. FIG. 9 is an explanatory diagram of arrangement of the core wires 7 in the gap 101. In FIG. 9, an imaginary line IL is illustrated that connects a central axis CL1 of the first core wire 7A and a central axis CL2 of the second core wire 7B. The imaginary line IL has an inclination angle θ, relative to the first direction X, that is restricted by the interval Lx between the first facing surface 2*a* and the second facing surface 3*a*. In specific, a minimum value θ1 of the inclination angle θ is determined by the interval Lx, the diameter D1 of the first core wire 7A, and the diameter D2 of the second core wire 7B.

The first distance L1 may be determined so that, for example, the minimum value θ1 of the inclination angle θ is 30°. The first distance L1 may be determined so that the minimum value θ1 of the inclination angle θ is 45°. The first distance L1 may be determined so that the minimum value θ1 of the inclination angle θ is 60°.

The first distance L1 may be determined so that the second core wire 7B comes into contact with either of the anvil 4 and the horn 5. FIG. 10 illustrates a state where the second core wire 7B comes into contact with the anvil 4. The central axis CL2 of the second core wire 7B is positioned above the central axis CL1 of the first core wire 7A. In this case, if the first distance L1 is short, the upper end of the second core wire 7B is located above the upper end of the first core wire 7A. Thus, when the anvil 4 descends, the second core wire 7B comes into contact with the anvil 4 first. Note that, from the state illustrated in FIG. 10, the anvil 4 may descend while deforming the second core wire 7B and come into contact with the first core wire 7A.

FIG. 11 illustrates a state where the second core wire 7B comes into contact with the horn 5. The central axis CL2 of the second core wire 7B is positioned below the central axis CL1 of the first core wire 7A. In this case, if the first distance L1 is short, the lower end of the second core wire 7B is located below the lower end of the first core wire 7A. Thus, the second core wire 7B comes into contact with the horn 5, and the first core wire 7A is separated from the horn 5. Note that, from the state illustrated in FIG. 11, the anvil 4 may press the first core wire 7A downward and cause the first core wire 7A to come into contact with the horn 5.

The number of the electrical cables 6 of the electrical cable bundle 60 is not limited to two. The electrical cable bundle 60 may include three or more electrical cables 6. For example, as illustrated in FIG. 12, four core wires 7 may be joined. The four core wires 7 consists of a first core wire 7A, a second core wire 7B, a third core wire 7C, and a fourth core wire 7D. The third core wire 7C and the fourth core wire 7D respectively have a diameter D3 and a diameter D4 that are smaller than the diameter D1 of the first core wire 7A and larger than the diameter D2 of the second core wire 7B. The first distance L1 is determined so that the aforementioned expression (1) is satisfied. Among the diameters D1, D2, D3, and D4 of the four core wires 7, the diameter D1 of the first core wire 7A has a maximum value, and the diameter D2 of the second core wire 7B has a minimum value. Thus, the first distance L1 is determined within a range indicated by the following expression (2).

$$D1<L1<D1+D2 \quad (2)$$

With the interval Lx between the first facing surface 2*a* and the second facing surface 3*a* set at the first distance L1, the four core wires 7 are placed in the gap 101. Even if the thickest first core wire 7A and the thinnest second core wire 7B are adjacent to each other, the first distance L1 determined as in the expression (2) prevents the first core wire 7A and the second core wire 7B from being aligned in parallel with the first direction X.

As described above, the electrical cable manufacturing method according to the present embodiment includes the process of setting the interval Lx to the first distance L1, the process of placing the core wires 7, and the process of joining the core wires 7. The process of setting the interval Lx to the first distance L1 is performed in the joining device 100. The joining device 100 includes the first facing surface 2*a* and the second facing surface 3*a* that face each other in the first direction X, and the anvil 4 and the horn 5 that face each other in the second direction Y. The second direction Y is orthogonal to the first direction X. The anvil 4 is an example pressing member. The horn 5 is an example vibrating member.

The process of placing the core wires 7 is performed by, for example, an operator. The operator places the core wires 7 between the first facing surface 2*a* and the second facing surface 3*a* having the interval Lx set at the first distance L1.

The process of joining the core wires 7 is performed by the joining device 100. The joining device 100 uses the horn 5 to apply ultrasonic vibration to the core wires 7 to join the core wires 7 while sandwiching the core wires 7 between the anvil 4 and the horn 5.

The core wires 7 includes the first core wire 7A and the second core wire 7B having outer diameters (diameters) having mutually different values. The first distance L1 is larger than the maximum value D1 between the values of the outer diameters of the core wires 7 and smaller than the sum of the minimum value D2 and the maximum value D1 of the outer diameters of the core wires 7. The electrical cable manufacturing method according to the present embodiment prevents the core wires 7 from being aligned in a direction parallel with the fourth facing surface 5*a* of the horn 5. Thus, the electrical cable manufacturing method according to the present embodiment can properly join the core wires 7 including the core wires 7 having different diameters.

The electrical cable manufacturing method according to the present embodiment further includes the process of setting the value of the first distance L1 in the joining device 100. The core wires 7 are tied together, and the information recording medium 40 on which the information about the first distance L1 is recorded is attached to the core wires 7. At the process of setting the first distance L1, the joining device 100 acquires the information recorded on the information recording medium 40 and sets the value of the first distance L1.

The electrical cable manufacturing apparatus 1 according to the present embodiment includes the first facing surface 2*a* and the second facing surface 3*a*, the anvil 4 and the horn 5, the controller 10, and the driving mechanism 20. The first facing surface 2*a* and the second facing surface 3*a* are surfaces facing each other in the first direction X. The anvil 4 is an example pressing member, and the horn 5 is an example vibrating member. The anvil 4 and the horn 5 face each other in the second direction Y orthogonal to the first direction X. The controller 10 acquires the first distance L1 corresponding to the outer diameters of the core wires 7 to be joined. The driving mechanism 20 varies the interval Lx between the first facing surface 2*a* and the second facing surface 3*a* in the first direction X.

The first distance L1 is larger than the maximum value between the values of the outer diameters of the core wires 7 and smaller than the sum of the minimum value between the values of the outer diameters of the core wires 7 and the maximum value. With the interval Lx set at the first distance L1, the electrical cable manufacturing apparatus 1 receives the core wires 7 in the gap 101 between the first facing surface 2*a* and the second facing surface 3*a*. The electrical cable manufacturing apparatus 1 uses the horn 5 to apply ultrasonic vibration to the core wires 7 to join the core wires 7 while sandwiching the core wires 7 between the anvil 4 and the horn 5. The electrical cable manufacturing apparatus 1 according to the present embodiment can properly join the core wires 7 including the core wires 7 having different diameters.

Note that the information recorded on the information recording medium 40 is not limited to the two-dimensional barcode 41. The information recording medium 40 may be, for example, an IC tag. In this case, the reading device 30 reads the information recorded on the information recording medium 40 through wireless communications.

Information on vibrating time during which ultrasonic vibration is applied at the joining process may be recorded on the information recording medium 40. For example, optimum vibrating time for the material and the diameters D of the core wires 7 is recorded on the information recording medium 40. The controller 10 issues the acquired vibrating time to the ultrasonic oscillator.

Information on the material of the core wires 7 may be recorded on the information recording medium 40. In this case, the controller 10 may be configured to calculate the vibrating time corresponding to the material of the core wires 7. The controller 10 may, for example, set different vibrating times between a case where all the core wires 7 are made from the same material and a case where the core wires 7 include core wires 7 made from different materials. The controller 10 may be configured to calculate the first distance L1 corresponding to the material of the core wires 7.

An operator may perform input operation of the first distance L1 to the joining device 100. In this case, for example, information, such as a numerical value, on the first distance L1 is recorded on the information recording medium 40. The operator reads the information recorded on the information recording medium 40 and inputs the information to the joining device 100. The joining device 100 sets the first distance L1 on the basis of the input information. Once the first distance L1 is set, it is valid until changed by the operator, for example.

The first direction X is not limited to the horizontal direction and may be, for example, the vertical direction. The second direction Y is not limited to the vertical direction and may be, for example, the horizontal direction. The joining device 100 may move the horn 5, instead of the anvil 4, in the second direction Y.

The operator may insert the core wires 7 in the gap 101 of the joining device 100 in predetermined order. The core wires 7 are placed in the order of, for example, a thick copper core wire 7, a thin copper core wire 7, a thick aluminum core wire 7, and a thin aluminum core wire 7 from the horn 5 toward the anvil 4 in the second direction Y.

The content disclosed in the above-described embodiment may be appropriately combined and implemented.

The electrical cable manufacturing method according to the embodiment includes the process of placing the core wires between the first facing surface and the second facing surface having the interval set at the first distance. The first distance is larger than the maximum value between the values of the outer diameters of the core wires and smaller than the sum of the minimum value between the values of the outer diameters of the core wires and the maximum value. The electrical cable manufacturing method according to the embodiment achieves an effect of properly joining the core wires including the core wires having different diameters.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical cable manufacturing method comprising:

setting an interval between a first facing surface and a second facing surface in a first direction to a first distance, in a joining device including the first facing surface and the second facing surface facing each other in the first direction, and a pressing member and a vibrating member facing each other in a second direction orthogonal to the first direction;

placing a plurality of core wires between the first facing surface and the second facing surface having the interval set at the first distance; and joining the core wires by using the vibrating member to apply ultrasonic vibration to the core wires while sandwiching the core wires between the pressing member and the vibrating member, wherein the core wires include core wires having outer diameters having mutually different values, and the first distance is larger than a maximum value between values of outer diameters of the core wires and smaller than a sum of the maximum value and a minimum value between the values of the outer diameters of the core wires.

2. The electrical cable manufacturing method according to claim 1, further comprising:

setting a value of the first distance in the joining device, wherein the core wires are tied together, and an information recording medium on which information about the first distance is recorded is attached to the core wires, and at the setting the value of the first distance, the joining device acquires the information recorded on the information recording medium and sets the value of the first distance.

3. An electrical cable manufacturing apparatus comprising:

a first facing surface and a second facing surface facing each other in a first direction;

a pressing member and a vibrating member facing each other in a second direction orthogonal to the first direction;

a controller configured to acquire a first distance corresponding to outer diameters of a plurality of core wires to be joined; and a driving mechanism configured to vary an interval between the first facing surface and the second facing surface in the first direction, wherein the first distance is larger than a maximum value between values of the outer diameters of the core wires and smaller than a sum of the maximum value and a minimum value between the values of the outer diameters of the core wires, the electrical cable manufacturing apparatus is configured to receive the core wires in a gap between the first facing surface and the second facing surface with the interval set at the first distance, and join the core wires by ultrasonic vibration applied to the core wires by the vibrating member while sandwiching the core wires between the pressing member and the vibrating member.

* * * * *